US010908364B2

(12) United States Patent
Beach et al.

(10) Patent No.: US 10,908,364 B2
(45) Date of Patent: Feb. 2, 2021

(54) FIBER OPTIC CONNECTORS WITH AT LEAST ONE FIELD-INSTALLABLE TERMINI

(71) Applicant: CORNING RESEARCH & DEVELOPMENT CORPORATION, Corning, NY (US)

(72) Inventors: Kevin Charles Beach, Bowie, TX (US); Jonathan Edward DeCortin, Woodbury, CT (US); David Wayne Meek, Ft. Worth, TX (US); Scott Eric Semmler, Keller, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/776,713

(22) Filed: Jan. 30, 2020

(65) Prior Publication Data

US 2020/0257055 A1   Aug. 13, 2020

Related U.S. Application Data

(60) Provisional application No. 62/842,113, filed on May 2, 2019, provisional application No. 62/802,969, filed on Feb. 8, 2019.

(51) Int. Cl.
*G02B 6/38* (2006.01)
*G02B 6/44* (2006.01)

(52) U.S. Cl.
CPC ......... *G02B 6/3806* (2013.01); *G02B 6/3857* (2013.01); *G02B 6/3858* (2013.01); *G02B 6/3871* (2013.01); *G02B 6/4477* (2013.01)

(58) Field of Classification Search
CPC .. G02B 6/3806; G02B 6/3857; G02B 6/3858; G02B 6/3871
See application file for complete search history.

(56) References Cited

U.S. PATENT DOCUMENTS

| 6,179,482 | B1 | 1/2001 | Takizawa et al. |
| 6,685,361 | B1 | 2/2004 | Rubino et al. |
| 6,931,193 | B2 | 8/2005 | Barnes et al. |
| 7,775,726 | B2 | 8/2010 | Pepin et al. |
| 8,834,042 | B2 | 9/2014 | Wouters |
| 10,151,887 | B2 | 12/2018 | De Jong et al. |
| 2014/0079356 | A1* | 3/2014 | Pepin ................... G02B 6/3624 385/81 |

FOREIGN PATENT DOCUMENTS

WO   2019067351 A1   4/2019

* cited by examiner

*Primary Examiner* — Sung H Pak
*Assistant Examiner* — Hoang Q Tran
(74) *Attorney, Agent, or Firm* — Adam R. Weeks

(57) ABSTRACT

A fiber optic connector comprises a shell, an insert, and at least one terminus sub-assembly. The shell defines an interior space and has a front portion. The insert is retained in the front portion of the shell. The at least one terminus sub-assembly at least partially received and retained in the insert. The at least one terminus sub-assembly includes a ferrule, a stub optical fiber secured to the ferrule, and a holder in which the stub optical fiber terminates. At least one splice component is retained with the holder and configured to be actuated and apply a clamping force to the stub optical fiber within the holder.

20 Claims, 9 Drawing Sheets

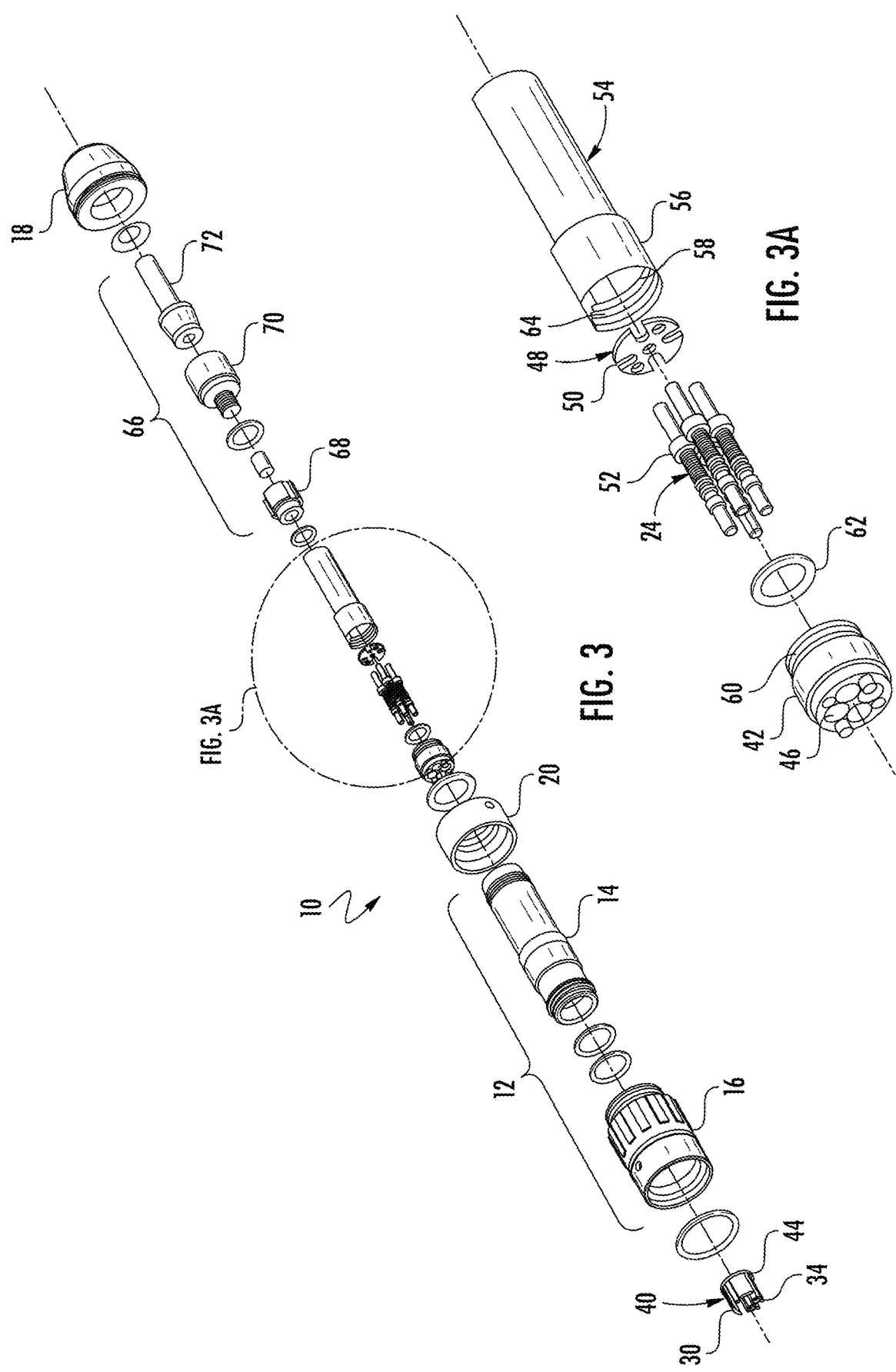

FIBER OPTIC CONNECTORS WITH AT LEAST ONE FIELD-INSTALLABLE TERMINI

PRIORITY APPLICATIONS

This application claims the benefit of priority of U.S. Provisional Application No. 62/842,113, filed on May 2, 2019, and U.S. Provisional Application No. 62/802,969, filed on Feb. 8, 2019, both applications being incorporated herein by reference.

BACKGROUND

This disclosure relates generally to optical connectivity, and more particularly to fiber optic connectors having at least one terminus that is designed to be installed onto an optical fiber in the field.

Optical fibers are commonly used for voice, video, and data transmissions. In a communications system that uses optical fibers, there are typically many locations where fiber optic cables that carry the optical fibers connect to equipment or other fiber optic cables. To conveniently provide these connections, fiber optic connectors are often provided on the ends of fiber optic cables. These connectors are sometimes referred to as "plug connectors" or simply "plugs" to distinguish from "receptacle connectors" (or simply "receptacles"), which are connection devices that are generally considered to be relatively more stationary in nature.

The process of installing a fiber optic connector onto one or more optical fibers is referred to as termination or connectorization. Termination can be done in a factory, resulting in a "pre-terminated" or "pre-connectorized" fiber optic cable, or the field using a "field-installable" connector. Most field-installable connector designs are intended for indoor or otherwise protected environments. But there are many applications where fiber optic connectors are used outdoors and, in some cases, potentially subject to harsh conditions. These connectors typically have a robust and ruggedized design, which presents some challenges in making them field-installable.

For example, some well-known fiber optic connectors designed for harsh conditions are referred to as TFOCA connectors, where TFOCA stands for Tactical Fiber Optic Cable Assembly. Although TFOCA connectors may have originated for use in military applications, they are also used in oil and gas, aerospace, and other applications. These connectors include a protective shell or body that typically houses fiber-terminating components referred to as termini. The termini are sub-assemblies packaged within the shell in a particular manner to maintain a robust design and comply with military specifications. These design constraints have contributed to the lack of field-installable variants of TFOCA connectors, even though applications exist where such variants may be useful.

Thus, there remains a need for field-installable connector designs suitable for outdoor environments, and particularly designs suitable for harsh conditions like TFOCA connectors.

SUMMARY

Embodiments of fiber optic connectors are provided in this disclosure. According to one embodiment, a fiber optic connector comprises a shell, an insert, and a plurality of termini sub-assemblies. The shell has a front portion. This insert is retained in the front portion of the shell and defines passages that extend through the insert. For example, the shell may define and interior space and have front opening into that interior space, and the insert may extend through the front opening. Each terminus sub-assembly of the plurality of termini sub-assemblies is partially received and retained in a respective one of the passages of the insert. Additionally, each terminus sub-assembly of the plurality of termini sub-assemblies comprises: a ferrule; a holder from which the ferrule extends; a stub optical fiber secured to the ferrule and extending to a splice location within the holder, wherein the splice location is spaced from the ferrule, and wherein the stub optical fiber terminates at the splice location; and at least one splice component retained with the holder for applying a clamping force to the stub optical fiber within the holder. Each terminus sub-assembly of the plurality of termini sub-assemblies are is configured so that the associated splice location is within the respective passage of the insert.

According to another embodiment, a fiber optic connector comprises a shell, an insert, and at least one terminus sub-assembly. The shell has a front portion. The insert is retained in the front portion of the shell. For example, the shell may define and interior space and have front opening into that interior space, and the insert may extend through the front opening. The at least one terminus sub-assembly at least partially received and retained in the insert. The at least one terminus sub-assembly comprises: a ferrule having a front end, a back end, and a ferrule bore extending between the front end and the back end; a holder from which the ferrule extends; a stub optical fiber secured within the ferrule bore, wherein the stub optical fiber extends from the back end of the ferrule and terminates at a splice location within the holder; at least one splice component retained with the holder, wherein the at least one splice component is configured to be actuated and apply a clamping force to the stub optical fiber within the holder; a spacer retained on the holder behind the splice location, wherein the holder can move in a longitudinal direction relative to the spacer; and a spring received over a portion of the holder that includes the splice location, wherein the spring biases the holder relative to the spacer in the longitudinal direction.

According to another embodiment, a fiber optic connector comprises a strain relief assembly configured to be secured to strength members of a fiber optic cable and allow at least one optical fiber of the fiber optic cable to extend therethrough. The fiber optic connector also includes a shell defining an interior space for accommodating the at least one cable optical fiber, wherein the shell includes a front portion (e.g., defining a front opening into the interior space) and a back portion (e.g., defining a back opening into the interior space). A portion of the strain relief assembly extends through the back opening and into the interior space. The fiber optic connector also includes: a spacing tube disposed within the interior space of the shell; an insert retained in the front portion of the shell, wherein the spacing tube extends from the strain relief assembly to the insert; a retaining member positioned between a portion of the spacing tube and a portion of the insert; and at least one terminus sub-assembly partially received and retained in the insert by the retaining member. The at least one terminus sub-assembly comprises: a ferrule having a front end, a back end, and a ferrule bore extending between the front end and the back end; a holder from which the ferrule extends, wherein the holder has a rear portion extending through the retaining member and configured to allow the at least one cable optical fiber to extend to a splice location within the holder;

a stub optical fiber secured within the ferrule bore, wherein the stub optical fiber extends from the back end of the ferrule and terminates at the splice location within the holder; and at least one splice component retained with the holder. The at least one splice component is configured to be actuated and apply a clamping force to the stub optical fiber and the at least one cable optical fiber within the holder.

Methods of installing a fiber optic connector onto a fiber optic cable using at least one field-installable terminus are also disclosed. According to one embodiment, such a method comprises: (a) inserting a cable optical fiber of the fiber optic cable into a holder of a terminus sub-assembly, wherein the terminus sub-assembly includes a ferrule extending from the holder, a stub optical fiber secured within a ferrule bore of the ferrule, and at least one splice component retained with the holder, and wherein the stub optical fiber extends from a back end of the ferrule and terminates at a splice location within the holder; (b) bringing respective ends of the stub optical fiber and cable optical fiber into contact at the splice location to form a mechanical splice; (c) actuating the at least one splice component to apply a clamping force to the stub optical and the cable optical fiber and thereby secure the mechanical splice; (d) inserting the terminus sub-assembly into an insert of the fiber optic connector, wherein the fiber optic connector also includes a shell defining an interior space; (e) positioning the insert in a front portion of the shell; (f) securing a strain relief assembly of the fiber optic connector to strength members of the fiber optic cable; and (g) securing the shell relative to the strain relief assembly.

Additional features and advantages will be set out in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 3 is an exploded isometric view of the fiber optic connector of FIG. 1, and FIG. 3A is a close-up view of the portion circled in FIG. 3.

DETAILED DESCRIPTION

Various embodiments will be clarified by examples in the description below. In general, the description relates to fiber optic connectors or plugs like TFOCA connectors, i.e. those that are designed for harsh conditions. The fiber optic connectors include a shell, a plurality of fiber optic termini (or, in some cases, a single fiber optic terminus), and an insert that supports the fiber optic termini in a front portion of the shell. The fiber optic termini have a unique design that facilitates their installation onto optical fibers in the field. Advantageously, the overall "foot print" of the fiber optic termini may be the same or similar as conventional designs for factory installation. This allows fiber optic termini according to this disclosure to be substituted for the conventional termini designs and used with known componentry (e.g., shells and inserts) to assemble fiber optic connectors that meet the same interface specifications as their factory-installed counterparts.

Example TFOCA Connector

Figure 1:
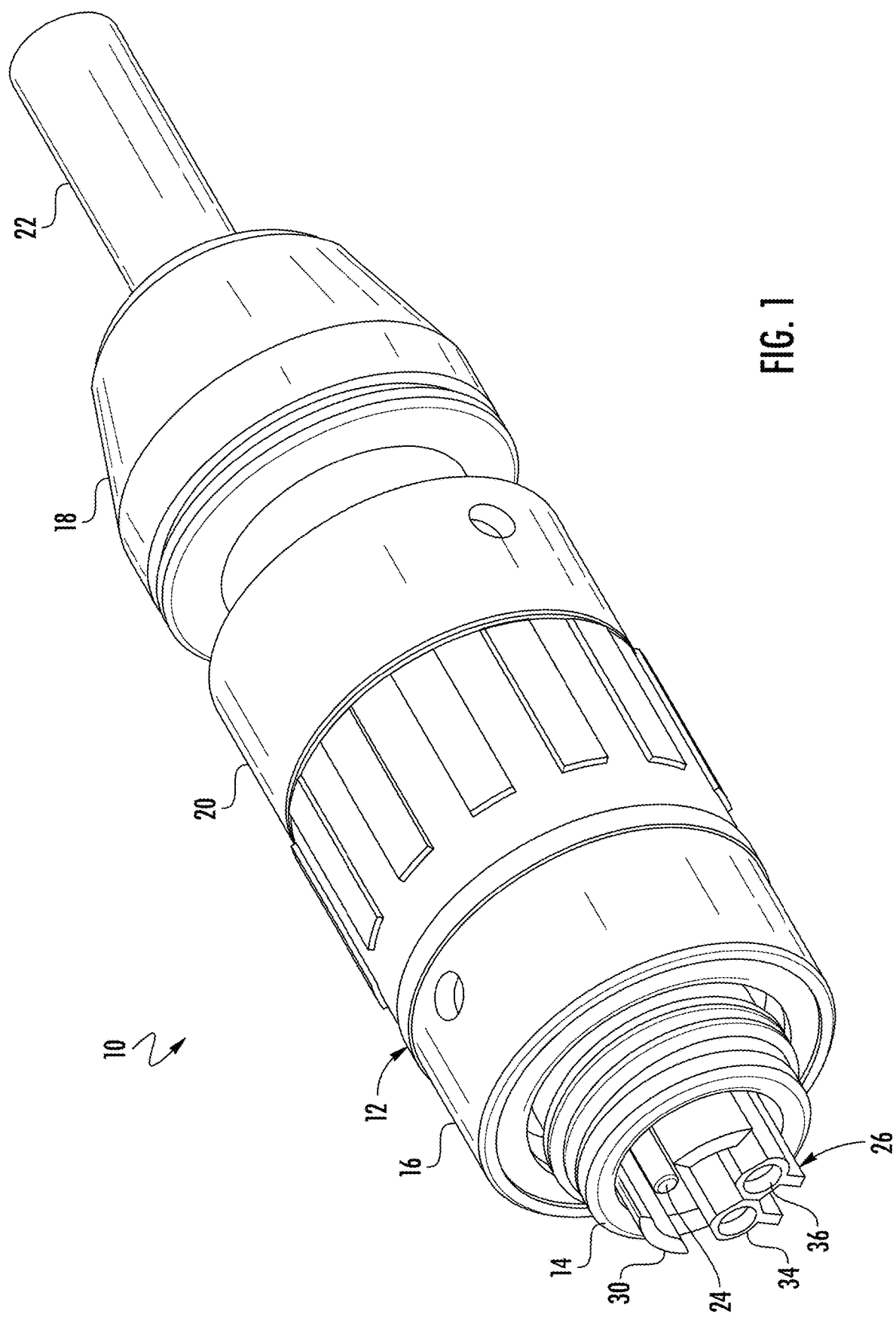
FIG. 1 is a perspective view of one example of a fiber optic connector.

To facilitate discussion and provide context for termini designs according to this disclosure, an example of a known TFOCA connector will first be described. To this end, FIG. 1 illustrates a fiber optic connector 10 ("connector 10") available from Stran Technologies (Naugatuck, Conn.). The connector 10 is referred to the TFOCA GenX and complies with the mechanical interface specifications MIL-PRF-83526/16 and /17. In general, the connector 10 includes a shell 12 defined by an inner shell 14 and an outer shell 16. Both are generally cylindrical. A backnut 18 is coupled to a rear portion of the inner shell 14, and a coupling nut 20 is coupled to a rear portion of the outer shell 16. The connector 10 is secured to a cable 22, which includes cable optical fibers (not shown) that extend into the inner shell 14. End portions of the cable optical fibers are secured to respective fiber optic termini 24 ("termini 24") that are at least partially supported by an insert 26 received in a front portion of the inner shell 14. The termini 24 are actually sub-assemblies comprising several components and, therefore, may alternatively be referred to as "termini sub-assemblies." The construction of the termini construction will be described in greater detail below.

In FIG. 1, only one of the termini 24 can be seen extending through insert 26. Another one of the termini 24 extends in a similar manner, but cannot be seen due the orientation of the connector 10 and the presence of protective fingers or extensions 30 on the insert 26 that obscure view. The portion of the insert 26 with the protective fingers 30 and the termini 24 that extend into the open space between the protective fingers 30 represents a male connection region. The connector 10 also includes female connection region defined by a projecting block portion 34 of the insert 26 under the male connection region. In this regard, the insert 26 has a stepped configuration. Two of the termini 24 (hidden in FIG. 1) extend into respective passages 36 defined within the projecting block portion 34 and, therefore, are associated with the female connection region. Such an arrangement is referred to as a four-channel, hermaphroditic connector design. The number of channels corresponds to the number of termini 24, and the hermaphroditic nature refers to the connector 10 being configured to mate with a similarly-configured connector without the need for a separate receptacle/adapter.

There are TFOCA connector designs with a different number of termini/channels, such as two, four, or eight. Again, it should be kept in mind that the connector 10 is merely an example being used to facilitate discussion. The termini provided by this disclosure (discussed in greater detail below) may be used not only with other TFOCA connector designs, but also with connector designs not associated with TFOCA products. This may include, for example, connector designs with only a single fiber optic terminus supported within a shell. Thus, although additional details of the connector 10 will now be described, the disclosure should not be limited to these details.

Figure 2:
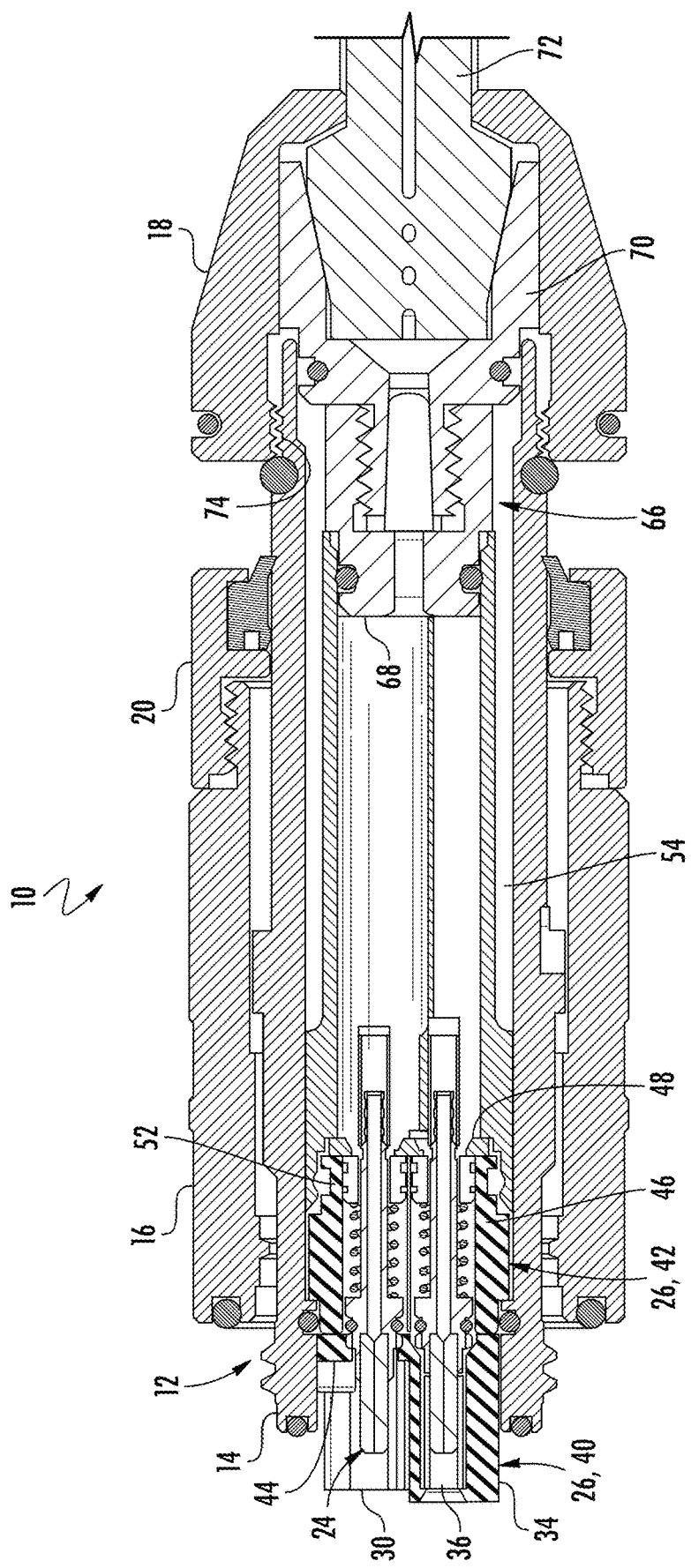
FIG. 2 is a cross-sectional view taken along line 2-2 in FIG. 1, showing a portion of the fiber optic connector of FIG. 1.

FIG. 2 is a cross-sectional view of the connector 10 as assembled, FIG. 3 is an exploded view of the connector 10, and FIG. 3A is an enlarged view of a portion of FIG. 3. The cable 22 (FIG. 1) is not shown in any of these figures simplify the drawings. Referring first to FIG. 2, the insert 26 in the embodiment shown is defined by two primary components: a front insert 40 and a rear insert 42. The front insert 40 includes the protective fingers 30 and the projecting block portion 34, both of which extend from a disc-shaped base portion 44. The base portion 44 is secured to the rear insert 42 when the connector 10 is assembled using fastening features (not shown in FIG. 2), which may be on the components themselves or separate fasteners.

The rear insert 42 is retained within the front portion of the inner shell 14 and includes passages 46 for that each receive one of the termini 24. The termini 24 extend through the passages 46 and into the male connection region or female connection region defined by the front insert 40. However, the geometry of the rear insert 42 and the termini 24 is such that portions of the termini 24 are retained in the passages 46; there is a limit to how far the termini 24 can extend. At the opposite side of the rear insert 42, a retaining member 48 maintains portions of the termini 24 within the passages 46. For example, as can be best understood with reference to FIGS. 3 and 3A, the retaining member 48 is a disc-shaped element that includes slots 50 for receiving the termini 24. The termini 24 extend through the slots 50, but a spacer 52 (discussed in greater detail below) on each termini 24 is sized greater than the slots 50. The retaining member 48 is maintained against a back of the rear insert 42 by a spacing tube 54. More specifically, the spacing tube 54 has a front portion 56 that receives both the retaining member 48 and a portion of the rear insert 42. The retaining member 48 is held between the back of the rear insert 42 and an internal shoulder 58 in the spacing tube 54. The portion of the rear insert 42 that is received in the spacing tube 54 includes a groove 60 that receives a sealing element 62 (e.g., o-ring), that is also received in an internal groove 64 in the front portion 56 of the spacing tube 54 when the connector 10 is assembled (note: FIG. 2 does not illustrate the sealing element 62 to simplify the drawing).

Referring to both FIGS. 2 and 3, a strain relief assembly 66 forms the back portion of the connector 10 together with the backnut 18. In general, the strain relief assembly 66 includes a stud 68, a strain relief body 70, and a boot 72. The stud 68 is threaded onto a front portion of the strain relief body 70, and although not shown, aramid yarn from the cable 22 may be captured between the threads of these components to secure the strain relief assembly 66 to the cable 22. A rear portion of the strain relief body 70 receives an enlarged front portion of the boot 72. A remainder of the boot 72 extends through the backnut 18, which extends over the strain relief assembly 66 and secures to threads 74 on the rear portion of the inner shell 14. These components forming the back portion of the connector 10 need not be described in further detail, as this disclosure pertains primarily to the termini and front portion of the connector 10.

Termini Design

Figure 4A:
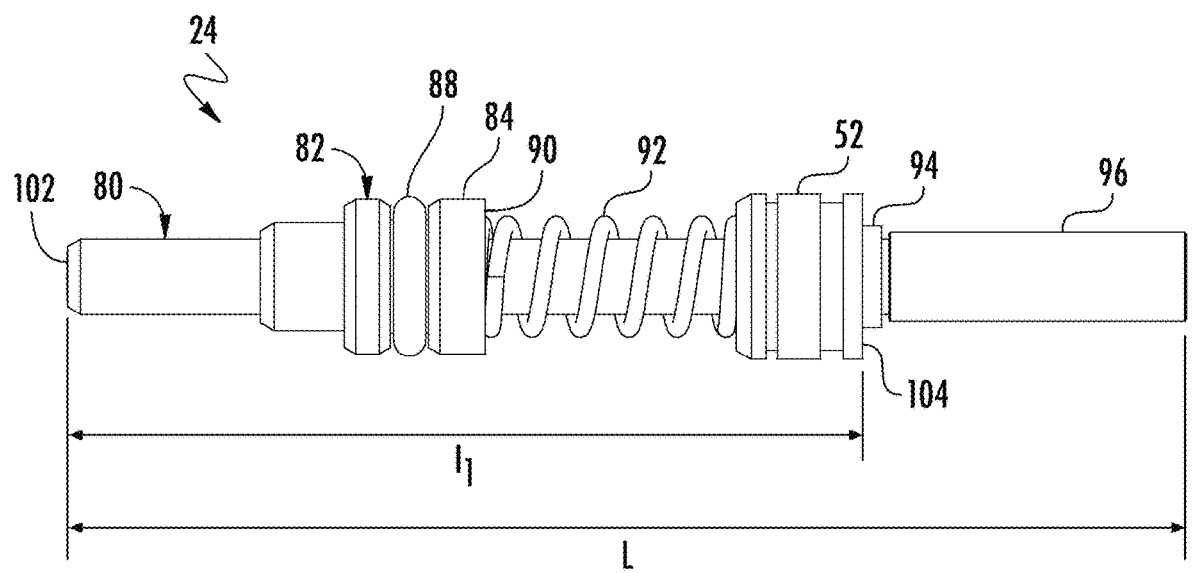
FIGS. 4A and 4B are side elevational and cross-sectional views of a fiber optic terminus having a conventional configuration.
Figure 4B:
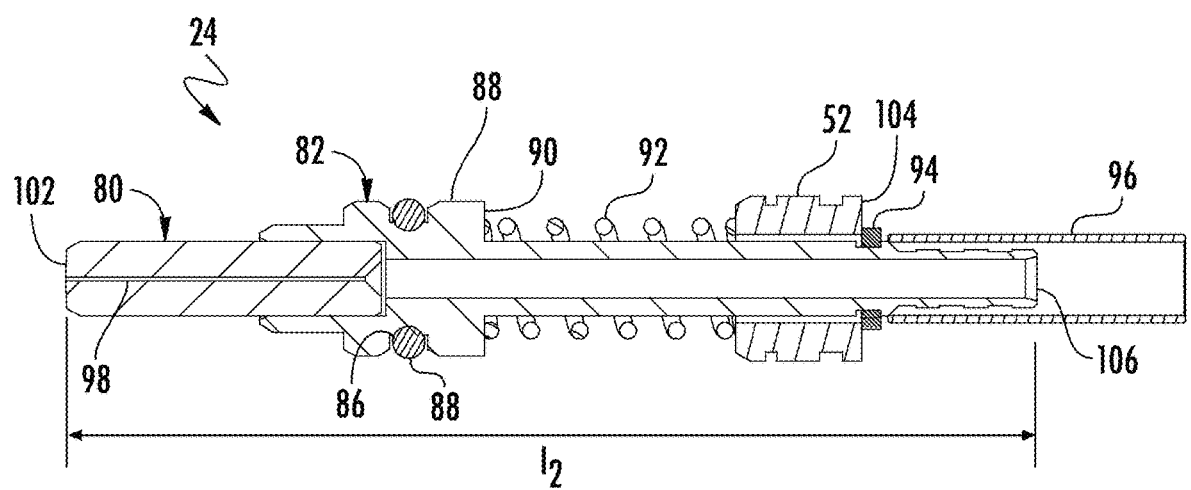

A direct comparison to existing termini will enable new termini designs according to this disclosure to be best appreciated. To this end, FIGS. 4A and 4B illustrate one of the termini 24 in isolation. The plural noun "termini" will still be used instead of the singular noun "terminus" when discussing these figures because the termini have a similar construction. The termini 24 each include a ferrule 80, a holder 82 from which the ferrule 80 extends, and the spacer 52. The ferrule 80 is a cylindrical element typically formed from zirconia or another ceramic material and typically has 2.5 or 1.25 mm nominal (i.e. stated or intended) outer diameter. The ferrule 80 is secured to the holder 82 by a press-fit and/or other suitable techniques (e.g., adhesion).

The holder 82 includes a flange portion 84 that defines a groove 86 for receiving a sealing element 88 (o-ring) and a rearward-facing shoulder or spring seat 90. A spring 92 that is received over the holder 82 extends between the flange portion 84 and the spacer 52. Although the spacer 52 is slidably received on the holder 82, a clip 94 that is secured to the holder 82 retains the spacer 52 on the holder 82. This allows the spring 92 to bias the holder 82 away from the spacer 52. A crimp tube 96 is received on a rear portion of the holder 82 that is behind the spacer 52. As can be appreciated, a cable optical fiber (not shown) can extend through the crimp tube 96, through the holder 82, and into a ferrule bore 98 of the ferrule 80. The end portion of the cable optical fiber, stripped of protective coating(s), can be secured in the ferrule bore 98 using a bonding agent (e.g., an adhesive such as epoxy).

In FIG. 4A, it can be seen how each termini 24 has an overall length L in the longitudinal direction. The distance between a front end 102 of the ferrule 80 and a back surface 104 of the spacer 52, when the holder 82 is biased away from the spacer 52, is labeled as length l1. And finally, in FIG. 4B, the distance between the front end 102 of the ferrule 80 and a back end 106 of the holder 82, again when the holder 82 is biased away from the spacer 52, is labeled as length l2.

Figure 5A:
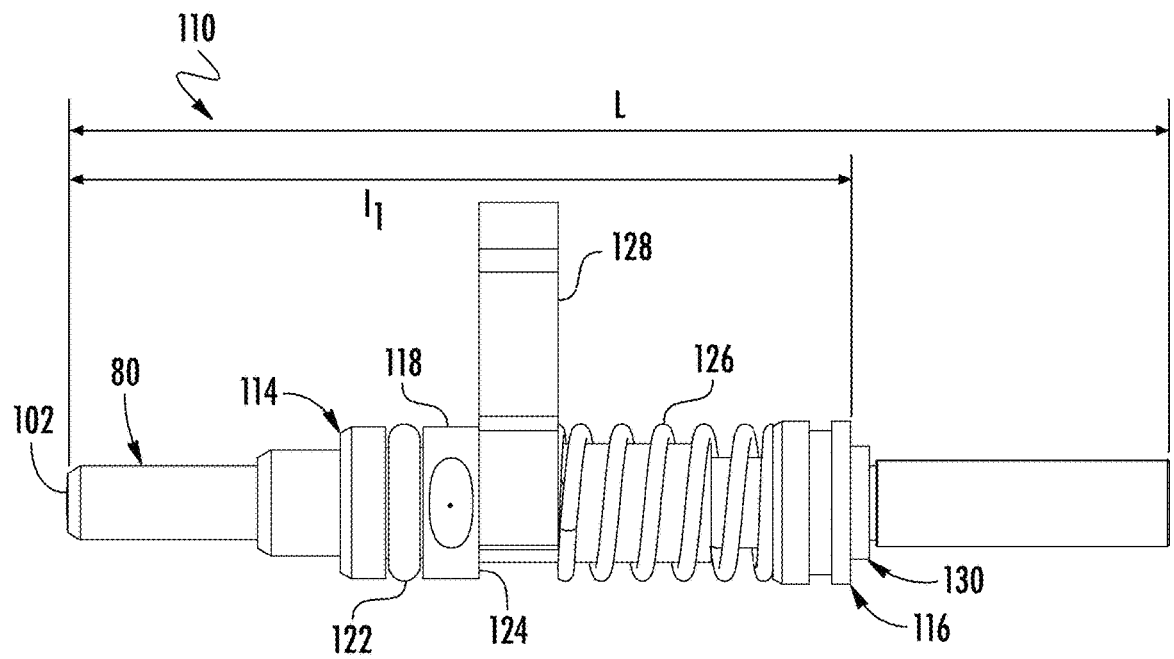
FIGS. 5A and 5B are side elevational and cross-sectional views of one example of a fiber optic terminus according to this disclosure.
Figure 5B:
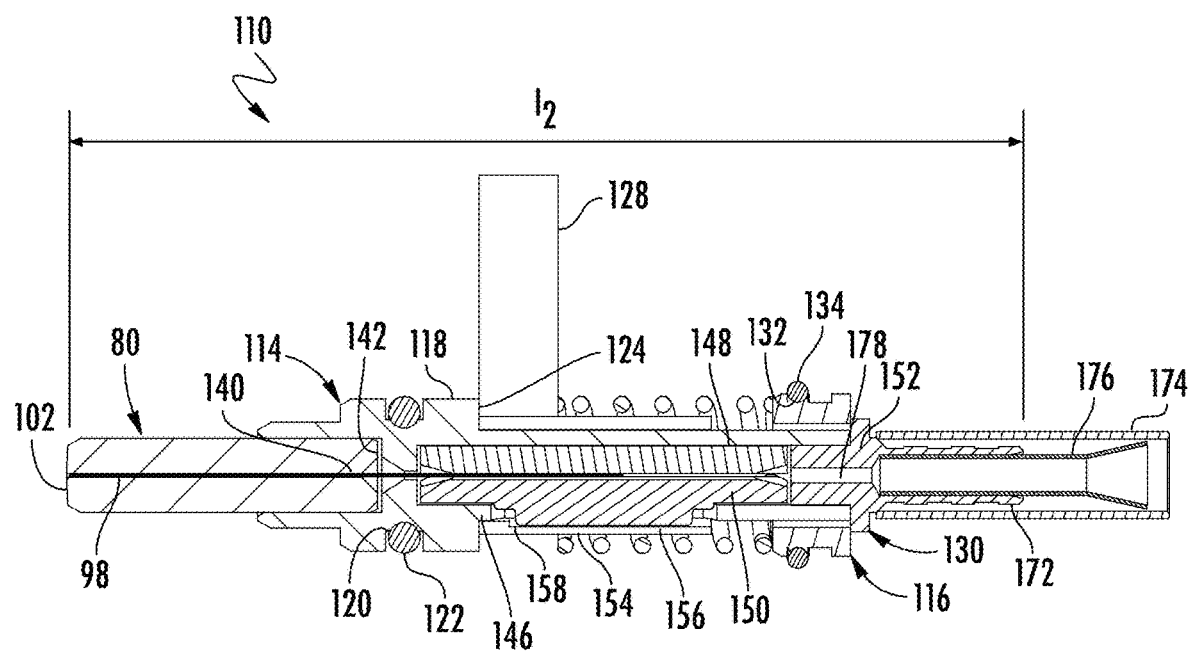

Now turning to FIGS. 5A and 5B, an example of termini 110 according to this disclosure is shown. The termini 110 include an overall length L, length l1, and length l2 that is the same or substantially the same (e.g., within acceptable tolerances) as the length L, length l1, and length l2 in the termini 24. This allows the termini 110 to be assembled in the connector 10 in the same manner as the termini 24. Other aspects of the termini 110, however, are substantially different.

As can be seen, the termini 110 are sub-assemblies (and in fact may be referred to as "termini sub-assemblies") that still include the ferrule 80, a holder 114 from which the ferrule 80 extends, and a spacer 116. There are no changes to the ferrule 80. Thus, the ferrule 80 is still a cylindrical element typically formed from zirconia or another ceramic material and typically has 2.5 or 1.25 mm nominal (i.e. stated or intended) outer diameter. The ferrule 80 is secured to the holder 114 by a press-fit and/or other suitable techniques (e.g., adhesion).

The holder 114 still includes a flange portion 118 that defines a groove 120 for receiving a sealing element 122 (e.g., o-ring) and a rearward-facing shoulder or spring seat 124. A spring 126 that is received on the holder 114 is not illustrated as contacting the spring seat 124 due to the presence of an actuator 128, whose purpose will be described in greater detail below. The spring 126 is a coil-spring configured to bias the holder 114 away from the spacer 116, which is ring or annular-shaped element received on the holder 114. Although the holder 114 can mover relative to the spacer 116 in a longitudinal direction, the movement is limited. A rear plug body 130 retains the spacer 116 on the holder 114 and limits the movement in one direction. The spacer 116 includes a groove for receiving a sealing element 134 that provides a seal with the passage 46 of the rear insert 42 (FIG. 2) when the connector 10 is assembled with the termini 110.

One of the key elements driving the changes in design of the termini 110 is a stub optical fiber 140 that is secured to the ferrule bore 98 of the ferrule 80. Specifically, the ferrule 80 includes the front end 102, a back end 142, and the ferrule bore 98 extending between the front and back ends 102, 142. The stub optical fiber 140 may be inserted into and secured to the ferrule bore 98 in a factory. The front end 102 of the ferrule 80 and an end of the stub optical fiber 140 may be polished or otherwise processed to a final intended geometry and quality in the factory. The ferrule 80 may also be secured to the holder 114 at the factory, with the stub optical fiber 140 extending from the back end 142 of the ferrule 80 and terminating within the holder 114 at a location that will be referred to as a "splice location."

In the embodiment shown, the splice location is inside a cavity 146 of the holder 114 that also receives a first splice component 148 and a second splice component 150. The first and second splice components 148, 150 are plank-like elements that are inserted into the cavity 146 through a rear opening 152 in the holder 114, prior to securing the rear plug body 130 to the holder 114. The stub optical fiber 140 extends between the first and second splice components 148, 150. One or both of the first and second splice components 148, 150 include a v-groove or other alignment features for aligning the stub optical fiber 140 with a cable optical fiber (not shown) when the first and second splice components 148, 150 are actuated. Such actuation and the insertion of the cable optical fiber through the rear plug body 130, into the cavity 146 of the holder 114, and into abutment with the stub optical fiber 140 will be described in further detail below.

The assembly of the first and second splice components 148, 150 and the rear plug body 130 with the holder 114 may all be done at the factory. Indeed, the termini 110 may be assembled as shown in FIGS. 5A and 5B at the factory. In addition to the first and second splice components 148, 150, the termini 110 each include a cam member 154 received on the holder 114. The arrangement is such that the spring 126 extends over at least a portion of the cam member 154. For example, the spring 126 may extend over the portion of the cam member 154 not covered by the actuator 128 when the actuator 128 is present, and completely over the cam member 154 when the actuator 128 is not present.

The actuator 128 is configured to rotate the cam member 154 relative to holder 114 in the embodiment shown. Doing so causes the cam member 154 to press a keel 156 of the second splice component 150 that extends through a window 158 of the holder 114. Ultimately the second splice component 150 is forced against the first splice component 148 within the holder 114 to apply a clamping force to the stub optical fiber 140 (and cable optical fiber, if present) at the splice location.

Figure 6:
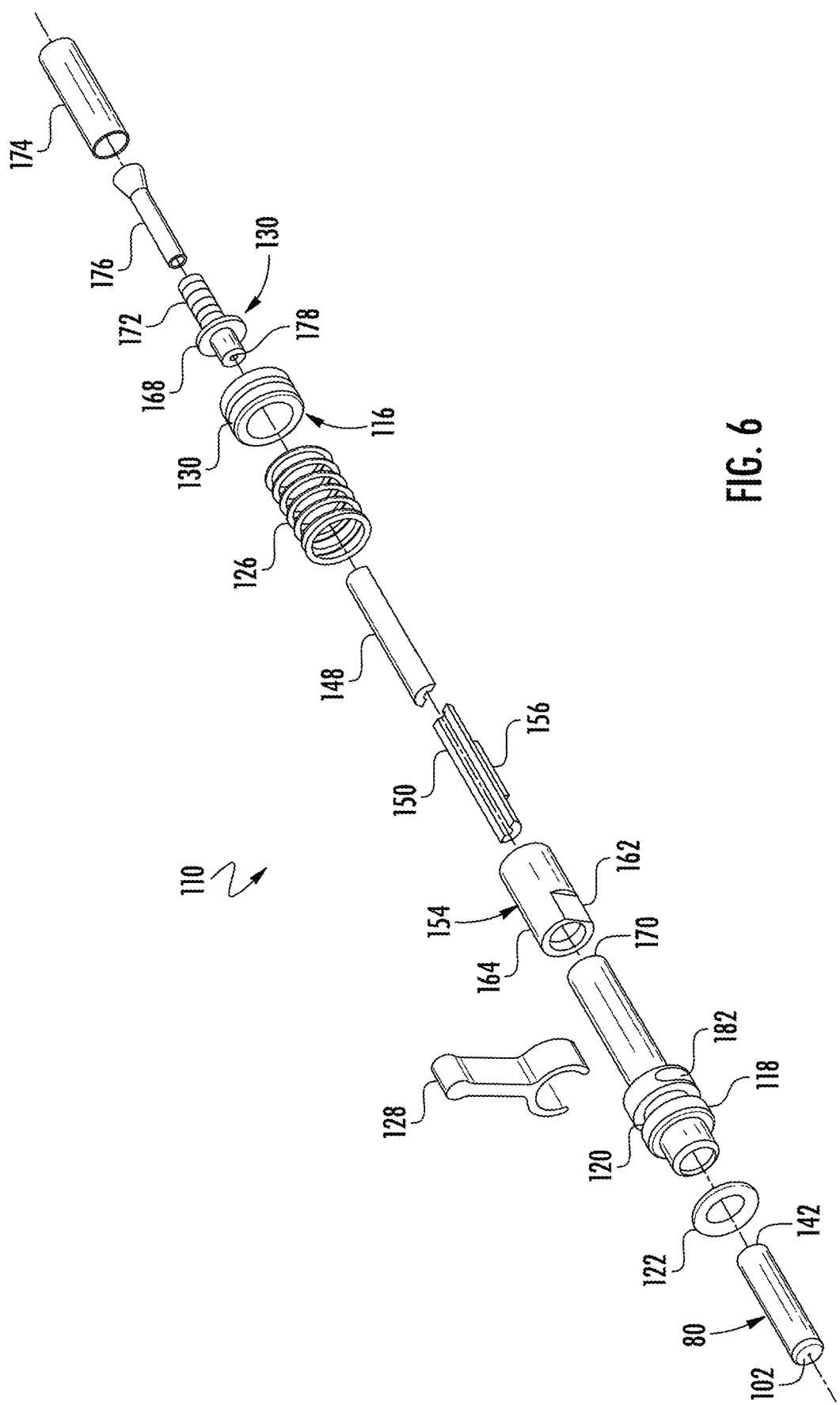
FIG. 6 is an exploded perspective view of the fiber optic terminus shown in FIGS. 5A and 5B.
Figure 7A:
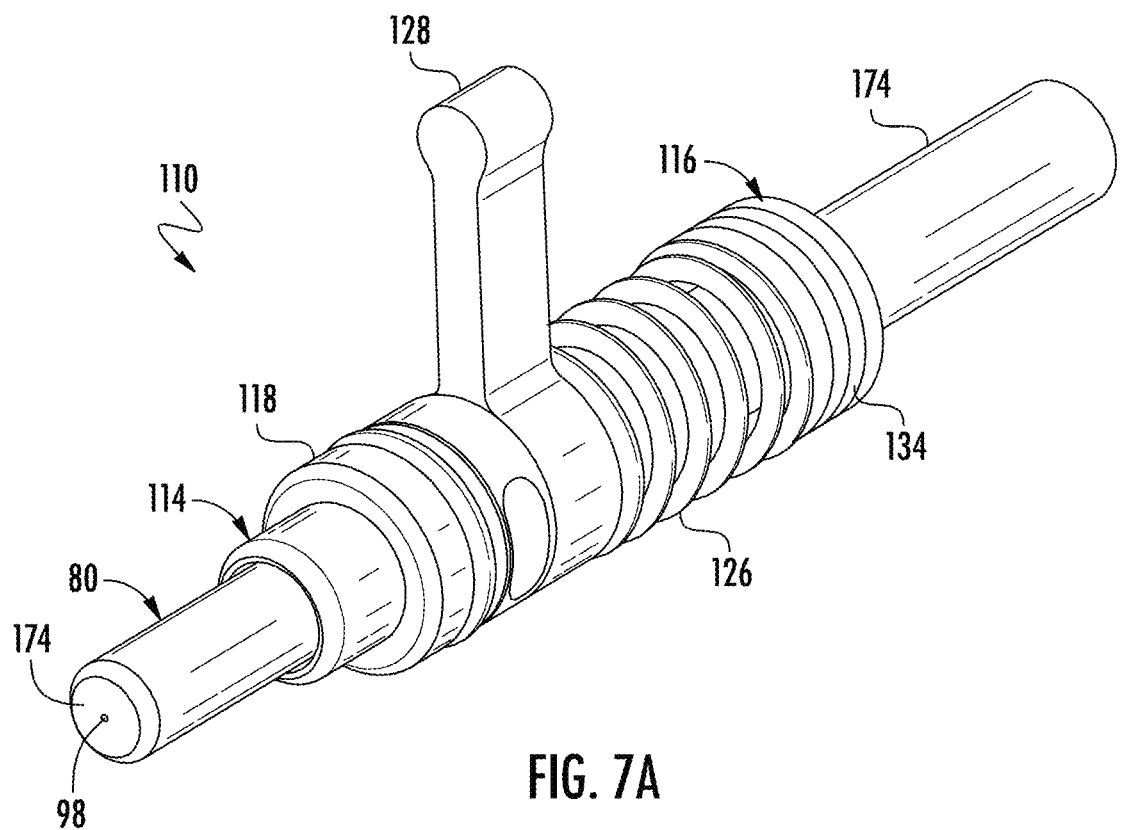
FIG. 7A is an assembled perspective view of the fiber optic terminus shown in FIGS. 5A and 5B.
Figure 7B:
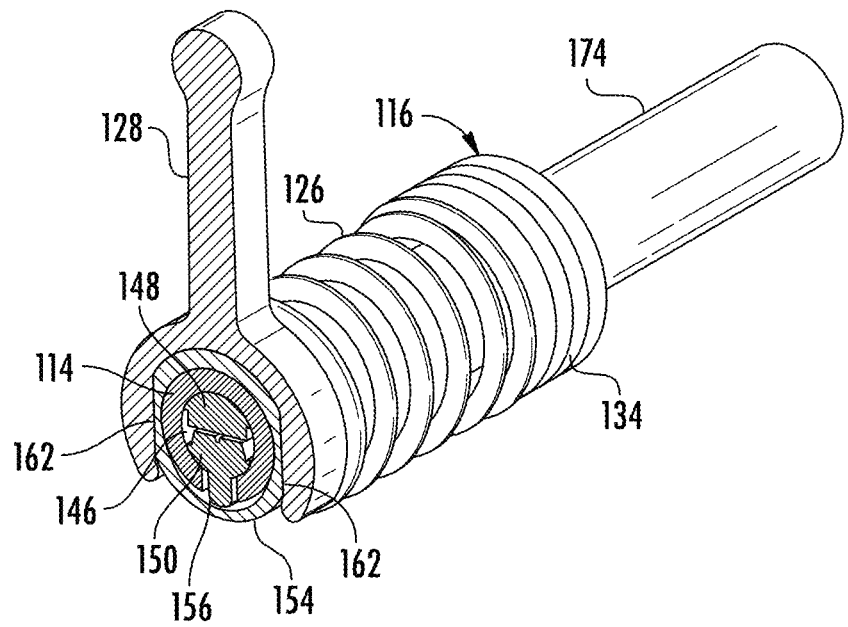
FIG. 7B is cross-sectional view to better illustrate internal components of the fiber optic terminus.

The actuation and clamping aspects can be better understood with reference to FIGS. 6, 7A, and 7B. As shown in these figures, the cam member 154 is generally cylindrical except for opposed flats or truncations 162 on a front portion 164 of the cam member 154. The actuator 128 is in the form of a wrench configured to engage the flats 162. Rotating the actuator 128 causes the cam member 154 to rotate, which in turn actuates the first and second splice components 148, 150 in the manner described above. Following actuation, the actuator 128 may be removed from the cam member 154 and discarded or saved for use with another one of the termini 110. The spring 126 can then extend from the spacer 116 to the spring seat 124 defined by the flange portion 118 of the holder 114.

Now referring back to FIGS. 5A and 5B, the rear plug body 130 includes a front portion 166 that extends through the rear opening 152 of the holder 114 and into the cavity 146. There may be an interference fit and/or adhesive between the components to secure them together. A flange portion 168 on the rear plug body 130 abuts a back end 170 of the holder 114 and serves as the stop/retainer for the spacer 116. The rear plug body 130 also includes a rear portion 172 that extends behind the holder 114. A crimp tube 174 is received over (and, in fact, configured to be deformed onto) to the rear portion 172 of the rear plug body 130. The crimp tube 174 extends beyond the rear plug body 130 and covers a lead-in tube 176 that facilitates inserting a cable optical fiber into holder 114. For example, the lead-in tube 176 is not only held by the rear portion 172 of the rear plug body 130, but also extends behind the rear plug body 130 (so as to be at partially outside the rear plug body 130) and has a cone-shaped entry portion within the crimp tube 174. A cable optical fiber can extend into the lead-in tube 176, through a passage 178 in the rear plug body 130, and into the cavity 146 of the holder 114 (e.g., between the first and second splice components 148, 150). In this regard, the passage 178 communicates with the cavity 146 of the holder 114.

Example Method of Installation

An example method of installing the connector 10 onto the cable 22, with the connector 10 including the termini 110 rather than the termini 24, will now be described with reference to FIGS. 8 and 9. These figures illustrate one of the termini 110 (referred below as terminus 110) supported on a portion of an installation tool 184. Initially the cam member 154 and actuator 128 are in an unactuated position. As mentioned previously, the actuator 128 may be installed in the factory as part of the terminus 110. Alternatively, a technician in the field may compress the spring 126 and install the actuator 128 on the terminus 110 in the field, either before or after supporting the terminus 110 on the installation tool 184.

Figure 8:
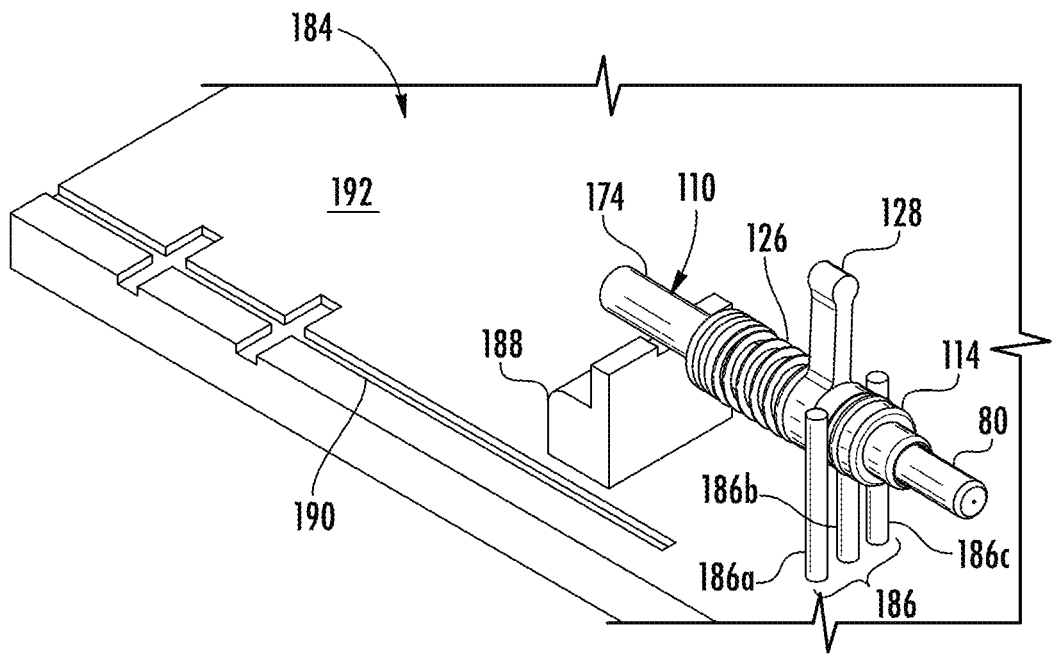
FIG. 8 is a perspective view of a portion of an example installation tool for the fiber optic terminus shown in FIGS. 5A and 5B.
Figure 9:
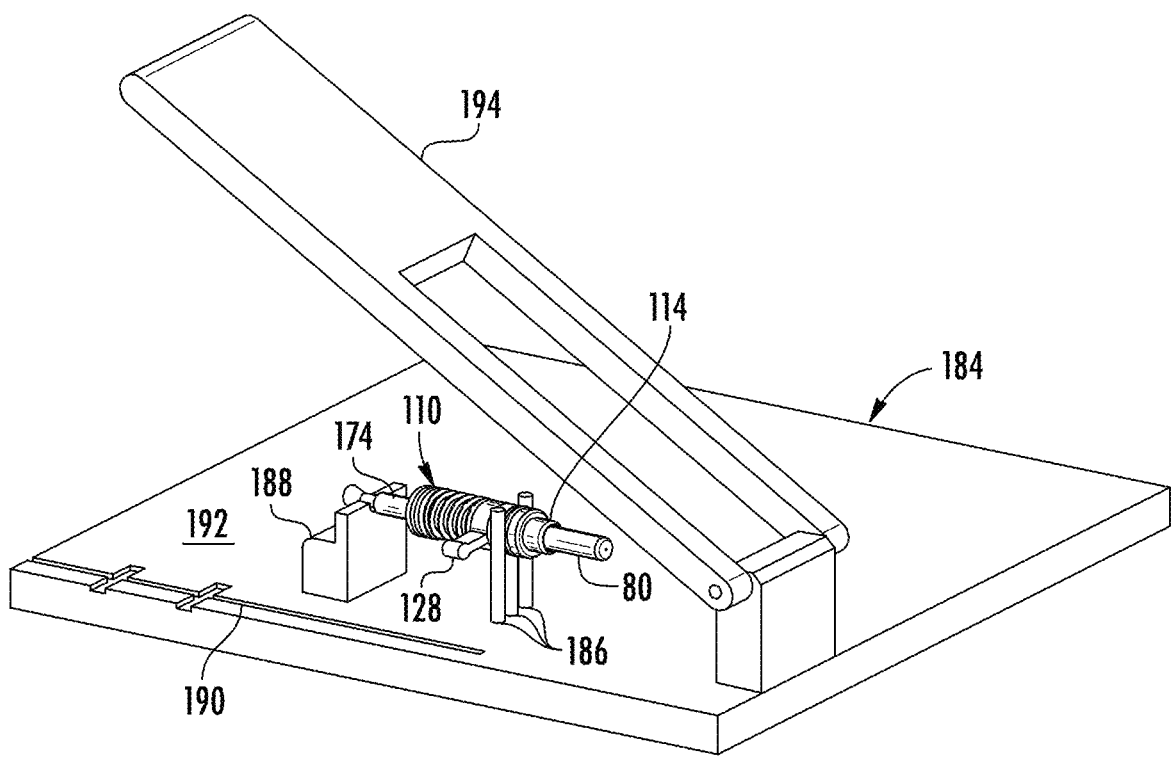
FIG. 9 is a perspective view showing more of the installation tool of FIG. 8.

In FIG. 8, the flange portion 118 of the holder 114 is cradled or held between three support posts 186. Specifically, the flange portion fits between the two outermost support posts 186a, 186c and rests on the middle support post 186b, which is shorter in length than the outermost support posts 186a, 186c. The spacing between the outermost support posts 186a, 186c may be only slightly greater than the width of the flange portion 118 between opposed, flat surfaces 182. Such an arrangement prevents rotation of the holder 114 while the terminus 110 is supported on the installation tool 184. A rear support block 188 is used to support the crimp tube 174 (and rear portion 172 of the rear plug body 130 within the crimp tube 174).

FIG. 8 illustrates measurement or demarcation features 190 on a base 192 of the installation tool 184. In general, the end of a cable (not shown) is prepared for the connector installation process by first removing a certain length of a cable jacket and one or more coatings on the cable optical fiber(s). The demarcation features 190 provided on the installation tool 184 may make the measurement of such lengths more convenient. Once the cable is appropriately prepared, the terminus 110 can be installed on one of the cable optical fibers. This involves inserting a cable optical fiber into the lead-in tube 176, through the rear plug body 130, and into the cavity 146 of the holder 114. As mentioned above, the cable optical fiber can be extended until it abuts an end of the stub optical fiber 140. This occurs between the first and second splice components 148, 150, at the splice location of the holder 114, and effectively forms a mechanical splice.

The actuator 128 is then rotated (FIG. 9) while maintaining the cable optical fiber in contact with the stub optical fiber 140. Because the outermost support posts 186a, 186c prevent the holder 114 from rotating with the actuator 128, the actuator 128 and the cam member 154 that is engaged with the actuator 128 rotate relative to the holder 114. This results in the cam member 154 pushing the second splice component 150 against the first splice component 148, as mentioned above. The first and second splice components 148, 150 further align the cable optical fiber and the stub optical fiber 140 as the first and second splice components 148, 150 are pushed together. Ultimately the first and second splice components 148, 150 clamp the cable optical fiber and stub optical fiber 140, maintaining them in position and securing the mechanical splice. Index-matching gel or similar material may be provided at the splice location to help further reduce optical losses associated with the mechanical splice.

The crimp tube 174 may then be deformed onto the rear portion 172 of the rear plug body 130 using other features on the installation tool 184. For example, FIG. 1 illustrates a crimping arm 194 pivotally connected to the base 192 of the installation tool 184. The crimping arm 194 is configured to rotate down onto the crimp tube 174, and configured to cooperate with the rear support block 188 to allow further application of force and compress/deform (i.e., crimp) the crimp tube 174 onto the rear plug body 130. Once the crimp tube 174 has been secured to the rear plug body 130, the crimping arm 194 may be rotated back so as to lift away from the terminus 110. The terminus 110 may then be removed from installation tool 184 or moved to a storage location (not shown) on the installation tool 184.

The process described above may be repeated for each of the remaining termini 110 and cable optical fibers. Alternatively, installation tools may be provided that are configured to support all of the termini 110 and allow some of the process steps to be completed in parallel. Ultimately each of the termini 110 are installed onto respective cable optical fibers. The assembly of the termini 110 with the insert 26 (FIG. 1) and shell 12 can then be completed by the technician as well. In fact any other steps needed to complete assembly of the connector 10 onto the cable 22 can be completed by the technician in the field.

As can be appreciated, although various assembly steps may be required, the connector 10 with the termini 110 is still suitable for installation in the field. The time and difficulty normally associated with bonding an optical fiber to a ferrule and carefully controlling the geometry and quality of the end face of the ferrule and optical fiber need not be performed by a technician in the field. These steps can remain being performed in a factory setting due to the design of the termini 110 including a stub optical fiber.

Example Alternative Embodiments

Figure 10:
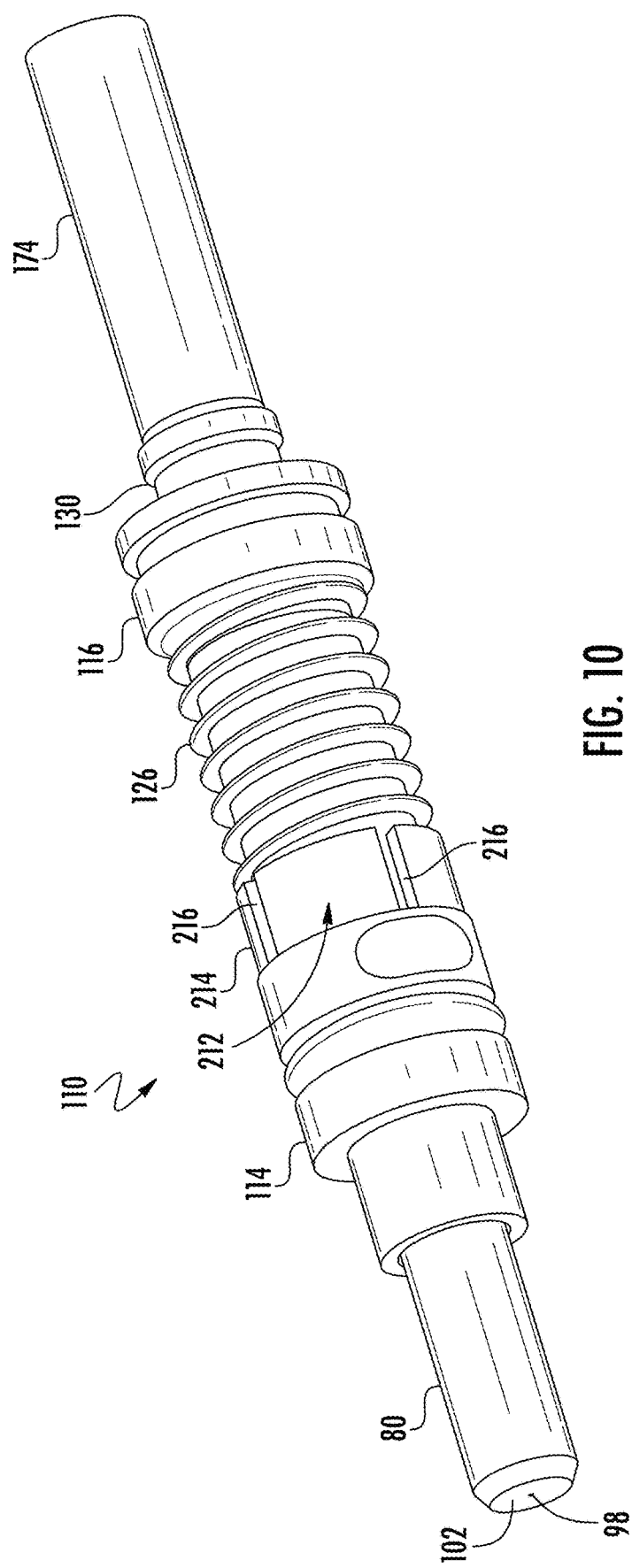
FIG. 10 is a perspective view of a fiber optic terminus according to another embodiment of this disclosure.

There are many alternatives and variations that will be appreciated by persons skilled in optical connectivity. For example, FIG. 10 illustrates one example of a terminus 210 that is a variation of the design of the termini 110. Similar reference numbers are used in FIG. 10 to refer to elements previously described. Only the differences will be discussed for conciseness. Unlike the termini 110, the terminus 210 is not assembled with the actuator 128. The terminus 210 instead has a cam member 212 with a collar portion 214 configured to be engaged and rotated by a different type of actuator (not shown). The collar portion 214 is shown as including a plurality of longitudinally-extending slots 216, which may serve as gripping locations for an actuator. The collar portion 214 also defines a spring seat 218 for the spring 126. Thus, instead of the spring 126 extending completely over the cam member 212 and contacting the flange portion 118 of the holder 114 when there is no actuator present, the spring 126 only extends to the collar portion 214. The spring 126 applies force to the collar portion 214 and biases the cam member 212 away from the spacer 116. The cam member 212, in turn, biases the holder 114.

A potential advantage of the design shown in FIG. 10 is that, even if a technician in the field needs to perform the step of engaging the cam member 212 with an actuator, the technician does not need to first push the spring 126 back toward the spacer 116 to expose the cam member 212. The collar portion 214 remains exposed and ready to be engaged by an actuator at all times.

In other embodiments, the termini may include a different type of cam member or a different type of actuation mechanism. Indeed, in some embodiments, the cavity 146 of the holder 114 may receive splice components that are not plank-like elements like the first and second splice components 148, 150. For example, U.S. Pat. No. 7,775,726 ("the '726 patent") illustrates a mechanical splice assembly with a gripping element and an actuating cap. The gripping element is a sheet of ductile material that is folded to define a hinge and two legs extending upwards. The actuating cap is positioned over the legs, but has an initial position where the legs extend slightly away from each other. Pushing the actuating cap results in cam bars on an interior of the actuating cap sliding over the legs of the gripping element, urging the legs toward one another. As can be appreciated, the legs are effectively first and second splice components, and the actuating cap is a form of cam member.

Thus, termini according to this disclosure may have a holder with a cavity that receives splice components like the legs of the gripping element in the '726 patent. The cam member in such embodiments may be like the actuating cap in the '726 patent, which may not be covered by the spring 126 when the termini is in an initial, assembled configuration. Once the actuating cap is actuated, however, there may be sufficient clearance for the spring 126 to extend over the actuating cap and contact a flange portion of the holder, as is the case in the termini 110 when the actuator 128 is removed. The disclosure of the gripping element and actuating cap in the '726 patent is incorporated herein by reference.

As another example, U.S. Pat. No. 6,179,482 ("the '482 patent") discloses a mechanical splice assembly where the stub optical fiber and cable optical fiber are clamped between a portion of the holder and cover members that serve as splice components. The stub optical fiber still extends from the back end of the ferrule and terminates within the holder in the sense that the stub optical fiber does not extend beyond the holder. Initially a release member in the form of a wedge pushes the spice components away from the holder, against the biasing force of a c-shaped clamping spring that surrounds these components. When the wedge is removed, the c-shaped clamping spring causes the stub optical fiber and cable optical fiber to be clamped between the holder and the splice components.

Thus, termini according to this disclosure may have a holder and splice components similar to those in the '482 patent. Rather than including a cam member, such embodiments may include a c-shaped clamping spring like in the '482 patent. The termini may be assembled in the factory with the wedge so that a cable optical fiber can be inserted between the holder and at least one of the covers, and ultimately make contact with the stub optical fiber at the splice location in the holder. The coil spring (e.g., spring 126) for biasing the holder away from the spacer 116 may be compressed and not cover the wedge. In such an embodiment, when the wedge is removed, the coil spring may extend completely over the c-shaped clamping spring and contact a flange portion of the holder, as is the case in the termini 110 when the actuator 128 is removed. The disclosure of mechanical splice assembly in the '482 patent is incorporated herein by reference.

The are many other alternatives and variations that will be appreciated by persons skilled in optical connectivity without departing from the spirit or scope of this disclosure. For at least this reason, the invention should be construed to include everything within the scope of the appended claims and their equivalents.

What is claimed is:

1. A fiber optic connector, comprising:
   a shell having a front portion;
   an insert retained in the front portion of the shell and defining passages that extend through the insert; and
   a plurality of termini sub-assemblies each at least being partially received and retained in a respective one of the passages of the insert, wherein each terminus sub-assembly of the plurality of termini sub-assemblies comprises:
   a ferrule;
   a holder from which the ferrule extends;
   a stub optical fiber secured to the ferrule and extending to a splice location within the holder, wherein the splice location is spaced from the ferrule, and wherein in the stub optical fiber terminates at the splice location; and
   at least one splice component retained with the holder for applying a clamping force to the stub optical fiber within the holder;
   wherein each terminus sub-assembly of the plurality of termini sub-assemblies is configured so that the associated splice location is within the respective passage of the insert.

2. The fiber optic connector of claim 1, wherein each terminus sub-assembly of the plurality of termini sub-assemblies further comprises:
   a spacer retained on the holder behind the splice location, wherein the holder is configured to move in a longitudinal direction relative to the spacer; and
   a spring received over a portion of the holder that includes the splice location, wherein the spring biases the holder relative to the spacer in the longitudinal direction.

3. The fiber optic connector of claim 2, wherein for each terminus sub-assembly of the plurality of termini sub-assemblies:
   the at least one splice component comprises first and second splice components received in a cavity of the holder; and
   the stub optical fiber extends between the first and second splice components.

4. The fiber optic connector of claim 3, wherein for each terminus sub-assembly of the plurality of termini sub-assemblies:
   the holder includes a window into the cavity;
   the second splice component includes a keel extending through the window; and
   the terminus sub-assembly further comprises a cam member received on the holder, wherein the spring extends over at least a portion of the cam member, and wherein the cam member is configured to rotate relative to the holder to engage and move the keel of the second splice component.

5. The fiber optic connector of claim 2, wherein each terminus sub-assembly of the plurality of termini sub-assemblies further comprises:
   a rear plug body secured to the holder for retaining the spacer on the holder, wherein the rear plug body includes a passage that extends through the rear plug body and communicates with the cavity of the holder.

6. The fiber optic connector of claim 5, wherein for each terminus sub-assembly of the plurality of termini sub-assemblies:
   the rear plug body includes a rear portion extending beyond the holder; and
   the terminus sub-assembly further includes a crimp tube configured to be received over the rear portion of the rear plug body.

7. The fiber optic connector of claim 6, wherein each terminus sub-assembly of the plurality of termini sub-assemblies further comprises:
   a lead-in tube received in at least the rear portion of the rear plug body, wherein the lead-in tube extends from the rear plug body and includes a cone-shaped entry portion outside of the rear plug body.

8. The fiber optic connector of claim 2, wherein for each terminus sub-assembly of the plurality of termini sub-assemblies, the holder includes a front portion that defines a spring seat for the spring such that the spring extends from the spring seat to the spacer.

9. The fiber optic connector of claim 1, wherein the plurality of termini sub-assemblies comprises at least four termini sub-assemblies.

10. The fiber optic connector of claim 1, further comprising:
    a strain relief assembly at least partially positioned in a rear portion of the shell;
    a spacing tube disposed within an interior space of the shell and extending from the insert to the strain relief assembly; and
    a retaining member positioned between a portion of the insert and a portion of the spacing tube, wherein each terminus sub-assembly of the plurality of termini sub-assemblies is retained in the front insert by the retaining member.

11. A fiber optic connector, comprising:
    a shell having a front portion;
    an insert configured to be retained in the front portion of the shell and defining passages that extend through the insert; and a plurality of termini sub-assemblies each configured to be at least partially received in a respective one of the passages of the insert and each comprising:
   a ferrule;
   a holder from which the ferrule extends;
   a stub optical fiber secured to the ferrule and extending to a splice location within the holder, wherein the splice location is spaced from the ferrule; and
   at least one splice component retained with the holder for applying a clamping force to the stub optical fiber within the holder;
wherein each terminus sub-assembly of the plurality of termini sub-assemblies is configured so that the associated splice location is within the respective passage of the insert when the terminus sub-assembly is at least partially received in the respective passage of the insert.

12. A fiber optic connector, comprising:
a shell having a front portion;
an insert retained in the front portion of the shell; and
at least one terminus sub-assembly at least partially received and retained in the insert, wherein each terminus sub-assembly of the at least one terminus sub-assembly comprises:
   a ferrule having a front end, a back end, and a ferrule bore extending between the front end and the back end;
   a holder from which the ferrule extends;
   a stub optical fiber secured within the ferrule bore, wherein the stub optical fiber extends from the back end of the ferrule and terminates at a splice location within the holder;
   at least one splice component retained with the holder, wherein the at least one splice component is configured to be actuated and apply a clamping force to the stub optical fiber within the holder;
   a spacer retained on the holder behind the splice location, wherein the holder can move in a longitudinal direction relative to the spacer; and
   a spring received over a portion of the holder that includes the splice location, wherein the spring biases the holder relative to the spacer in the longitudinal direction.

13. The fiber optic connector of claim 12, wherein for each terminus sub-assembly of the at least one terminus sub-assembly:
the at least one splice component comprises first and second splice components received in the cavity of the holder; and
the stub optical fiber extends between the first and second splice components.

14. The fiber optic connector of claim 13, wherein for each terminus sub-assembly of the at least one terminus sub-assembly:
the holder includes a window into the cavity;
the second splice component includes a keel extending through the window; and
the terminus sub-assembly further comprises a cam member received on the holder, wherein the spring extends over at least a portion of the cam member, and wherein the cam member is configured to rotate relative to the holder to engage and move the keel of the second splice component.

15. The fiber optic connector of claim 12, wherein each terminus sub-assembly of the at least one terminus sub-assembly further comprises:
a rear plug body secured to the holder for retaining the spacer on the holder, wherein the rear plug body includes a passage that extends through the rear plug body and communicates with the cavity of the holder.

16. The fiber optic connector of claim 15, wherein for each terminus sub-assembly of the at least one terminus sub-assembly:
the rear plug body includes a rear portion extending beyond the holder; and
the terminus sub-assembly further includes a crimp tube configured to be received over the rear portion of the rear plug body.

17. The fiber optic connector of claim 16, wherein each terminus sub-assembly of the at least one terminus sub-assembly further comprises:
a lead-in tube received in at least the rear portion of the rear plug body, wherein the lead-in tube extends from the rear plug body and includes a cone-shaped entry portion outside of the rear plug body.

18. The fiber optic connector of claim 12, wherein for each terminus sub-assembly of the at least one terminus sub-assembly, the holder includes a front portion that defines a spring seat for the spring such that the spring extends from the spring seat to the spacer.

19. The fiber optic connector of claim 12, further comprising:
a strain relief assembly at least partially positioned in a rear portion of the shell;
a spacing tube disposed within an interior space of the shell and extending from the insert to the strain relief assembly; and
a retaining member positioned between a portion of the insert and a portion of the spacing tube, wherein each terminus sub-assembly of the at least one terminus sub-assembly is retained in the front insert by the retaining member.

20. A fiber optic connector for a fiber optic cable that includes strength members and at least one cable optical fiber, the fiber optic connector comprising:
a strain relief assembly configured to be secured to the strength members of the fiber optic cable and allow the at least one cable optical fiber to extend therethrough;
a shell defining an interior space for accommodating the at least one cable optical fiber, wherein the shell includes a front portion and a back portion, and wherein a portion of the strain relief assembly extends through the back opening and into the interior space;
a spacing tube disposed within the interior space of the shell;
an insert retained in the front portion of the shell, wherein the spacing tube extends from the strain relief assembly to the insert;
a retaining member positioned between a portion of the spacing tube and a portion of the insert; and
at least one terminus sub-assembly partially received and retained in the insert by the retaining member, wherein each terminus sub-assembly of the at least one terminus sub-assembly comprises:
   a ferrule having a front end, a back end, and a ferrule bore extending between the front end and the back end;
   a holder from which the ferrule extends, wherein the holder has a rear portion extending through the retaining member and configured to allow a cable optical fiber of the at least one cable optical fiber to extend to a splice location within the holder;
   a stub optical fiber secured within the ferrule bore, wherein the stub optical fiber extends from the back end of the ferrule and terminates at the splice location within the holder; and at least one splice component retained with the holder, wherein the at least one splice component is configured to be actuated and apply a clamping force to the stub optical fiber and the cable optical fiber within the holder.

* * * * *